United States Patent [19]

Wolff

[11] 3,870,956

[45] Mar. 11, 1975

[54] SOUND MUTING CIRCUIT WITH AUTOMATIC SOUND RETURN

[75] Inventor: Robert A. Wolff, Lombard, Ill.

[73] Assignee: Admiral Corporation, Chicago, Ill.

[22] Filed: Sept. 17, 1973

[21] Appl. No.: 397,942

[52] U.S. Cl. .................. 325/478, 325/319, 325/348, 325/395

[51] Int. Cl. .................. H04b 1/10

[58] Field of Search .................. 179/1 SW, 1 VC; 178/DIG. 15; 325/348, 395, 396, 478, 390, 392, 37

[56] References Cited

UNITED STATES PATENTS

| | | | |
|---|---|---|---|
| 3,493,681 | 2/1970 | Richards | 179/1 SW |
| 3,628,153 | 12/1971 | Fukata | 325/395 |
| 3,748,495 | 7/1973 | Messinger | 179/1 SW X |

*Primary Examiner*—Robert L. Griffin
*Assistant Examiner*—Aristotelis M. Psitos
*Attorney, Agent, or Firm*—Hill, Gross, Simpson, Van Santen, Steadman, Chiara & Simpson

[57] ABSTRACT

A circuit to mute the sound of a television receiver or radio receiver by remote control including a muting switch and wherein the circuit disables the sound for a predetermined time after which the sound automatically is reconnected. If desired the sound may be returned earlier than the present time by depressing the muting switch a second time. A flip-flop circuit is triggerd from the muting switch to turn off a transistor connected in the sound system. While the sound system is disconnected a capacitor charges slowly through the base emitter junction of another transistor until the other transistor is suddenly turned off to provide a trigger for resetting the flip-flop which allows the first transistor to be turned on and sound to be reconnected to its output.

10 Claims, 1 Drawing Figure

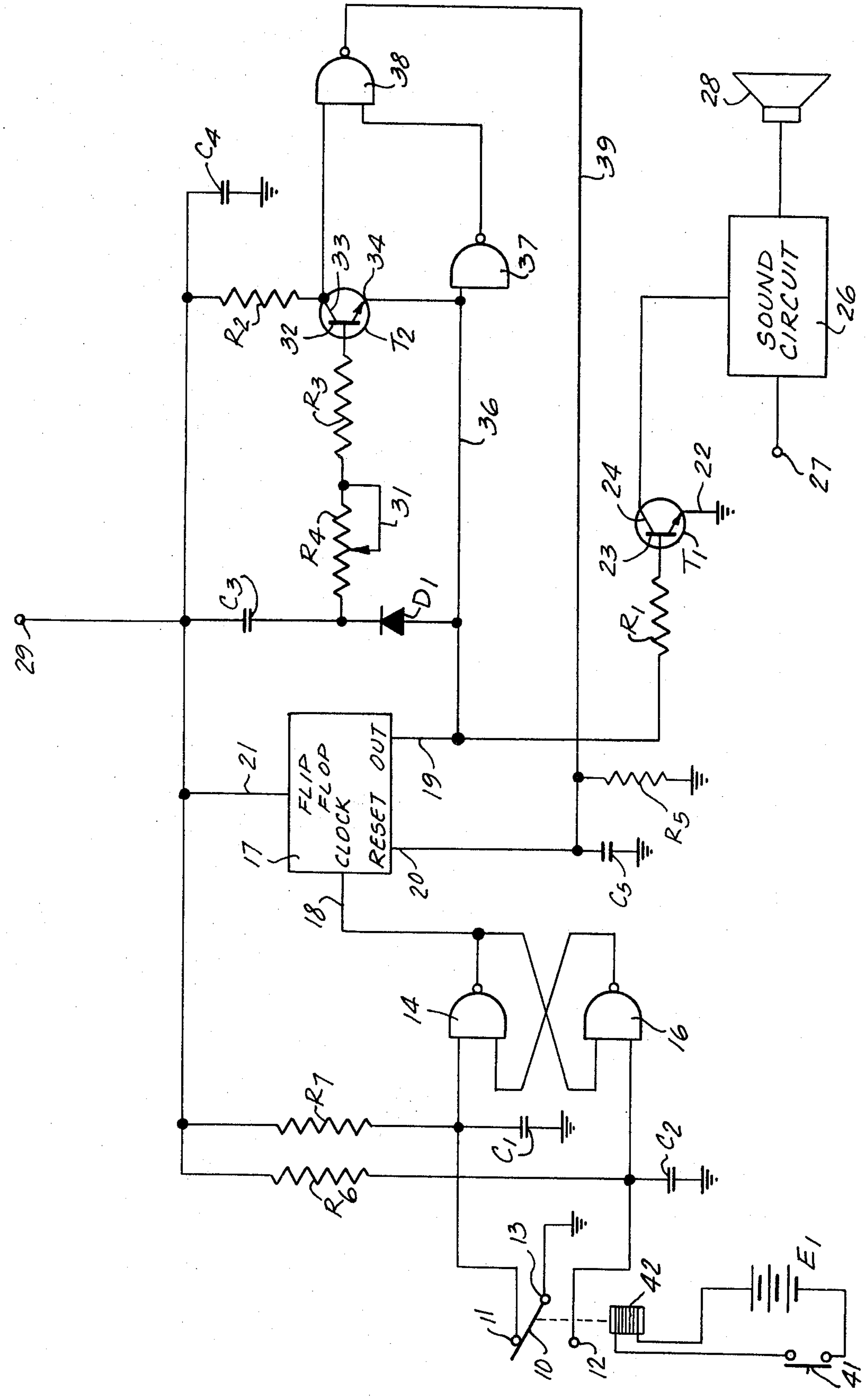
FLIP FLOP
CLOCK
RESET
OUT
SOUND CIRCUIT
C4
R2
R3
R4
C3
D1
R1
R5
C5
R7
R6
C1
C2
E1
T1
T2
10
11
12
13
14
16
17
18
19
20
21
22
23
24
26
27
28
29
31
32
33
34
36
37
38
39
41
42

SOUND MUTING CIRCUIT WITH AUTOMATIC SOUND RETURN

BACKGROUND OF THE INVENTION

1. Field of the Invention

This invention relates in general to sound muting systems and in particular to an automatic sound muting system for a radio or television set.

2. Description of the Prior Art

It is desirable at times to turn off the sound of television sets for short periods but it has previously been necessary to manually turn off the sound by changing the volume control after which the volume control must be readjusted to reestablish sound.

SUMMARY OF THE INVENTION

The present invention provides an automatic muting circuit for a television receiver wherein the sound may be momentarily turned off by remote control by the pushing of a push button switch after which the sound automatically returns after a predetermined period of time. The circuit also provides for automatic override of the automatic sound return by closing the "mute" button a second time which will immediately reestablish the sound before the end of the predetermined period.

Thus the present invention allows a user to disable a circuit as for example a sound circuit in a television set for a predetermined period of time after which the circuit will be automatically reenergized to reestablish the sound.

Other objects, features and advantages of the invention will be readily apparent from the following description of certain preferred embodiments thereof taken in conjunction with the accompanying drawing although variations and modifications may be effected without departing from the spirit and scope of the novel concepts of the disclosure and in which

BRIEF DESCRIPTION OF THE DRAWINGS

The FIGURE illustrates the invention in schematic form.

DESCRIPTION OF THE PREFERRED EMBODIMENTS

The FIGURE illustrates a push botton switch 41 which has one terminal connected to the first terminal of a power source E1. The second terminal of the switch 41 is connected to one side of a remote relay 42 which has its other terminal connected to the second terminal of the power source E1. The relay 42 controls the position of a movable switch contact 10 which is connected to terminal 13 that is grounded. The switch contact 10 moves between contacts 11 and 12. Contact 11 is connected to a NAND gate 14 and to one side of a capacitor C1 which has its opposite side connected to ground. Contact 12 is connected to an input of a NAND gate 16 and to one side of a capacitor C2 which has its other side connected to ground. The NAND gates 14 and 16 form part of a type 7400 quad dual input NAND gate wherein the output of the NAND gate 14 is connected to a second input of the NAND gate 16 and the output of the NAND gate 16 is connected to a second input of the NAND gate 14. The output of the NAND gate 14 is also connected to the clock input 18 of a flip-flop circuit 17 which might be a type 74 72 integrated circuit. A power supply as for example 5 volts is connected to an input terminal 29 which is connected to a resistor R6 which has its opposite side connected to input terminal 12. The power terminal 29 is also connected to a resistor R7 which has its opposite side connected to input terminal 11. An input is supplied to a lead 21 from power terminal 29 to the flip-flop circuit 17. An output terminal 19 of the flip-flop circuit 17 is connected through a resistor R1 to the base 23 of a transistor T1. The emitter 22 of the transistor T1 is connected to ground. The collector 24 of transistor T1 is connected to a sound circuit 26. The sound circuit 26 has an output terminal connected to a loudspeaker 28 and receives sound input from terminal 27. When the transistor T1 is conducting, the sound circuit 26 connects the sound to the loudspeaker 28. When the transistor T1 is in the nonconducting state, the sound is disconnected from the loudspeaker 28. The output terminal 19 of the flip-flop circuit 17 is also connected by lead 36 to the input of an inverter 37 which has its output connected to an input of a NAND gate 38. The output of NAND gate 38 is connected by lead 39 to the reset terminal 20 of the flip-flop circuit 17. A capacitor C5 and resistor R5 are connected between ground and reset terminal 20. A second transistor T2 has its emitter 34 connected to lead 36 and collector 33 is connected to the second input terminal of NAND gate 38. A resistor R2 is connected between collector 33 and power terminal 29. A capacitor C4 is connected between power terminal 29 and ground. A capacitor C3 has one side connected to power terminal 29. A diode D1 has its anode connected to terminal 19 and its cathode connected to the second side of capacitor C3. A resistor R4 is connected to the junction point between diode D1 and capacitor C3 and has its opposite terminal connected to one side of a resistor R3 which has its other side connected to the base 32 of transistor T2. A slide contact 31 is connected from the junction point of resistors R3 and R4 and engages resistor R4 to vary its resistance.

In operation, the output terminal 19 of flip-flop circuit 17 is normally in its high state and this causes the transistor T1 to be in the conducting state, thus turning on the sound circuit 26 allowing sound to be passed to the loudspeaker 28. The capacitor C3 is normally discharged through the diode D1 during the time that the output terminal 19 of the flip-flop circuit 17 is at its high state. If the push button switch 41 is depressed to energize the relay 42 moving the contact 10 from engagement with contact 11 to contact 12 will cause a pulse to be applied to terminal 18 of the flip-flop circuit 17 thus causing it to change conditions at output terminal 19 so that output terminal 19 goes to the low state which will turn off transistor T1 thus disconnecting the loudspeaker 28 from the sound input of the sound circuit 26. Transistor T2 is conducting during this period because capacitor C3 begins to charge at the time when terminal 19 of the flip-flop changes to the "low" state and capacitor C3 will charge through resistors R4 and R3 and the base to emitter circuit of transistor T2 for an appreciable time. For example, the time constant of capacitor C3 and the resistor R3, R4 and the base to emitter resistance of transistor T2 might be of the order of one minute. When the capacitor C3 is substantially charged, the transistor T2 will quickly turn off which provides an output from the NAND gate 38 to the reset terminal 20 of the flip-flop 17 which will trigger the flip-flop back to its original state wherein the output on terminal 19 is "high." This again turns on transistor T1 and sound is reconnected to the loudspeaker 28.

If prior to the full charge of capacitor C3 thru resistors R4 and R3 and the base to emitter circuit of transistor T2 the push button switch 41 is again depressed the relay 42 will be energized thus moving the contact 10 causing the flip-flop 17 to be reset prior to charge of the capacitor C3 and the terminal 19 will immediately return to "high" state and the transistor T1 will be turned on thus reestablishing sound to the speaker 28. The capacitor C3 is quickly discharged through the diode D1 when the terminal 19 is in its "high" state.

It is seen that this invention provides a novel sound muting circuit with automatic sound return wherein the sound circuit of a television set can be turned off and will automatically be turned back on after a preset time. The slide contact 31 allows the time constant of the charge circuit of capacitor C3 to be varied so that the time may be varied as a function of the setting of the slide contact 31.

Although the invention has been described with respect to the preferred embodiments it is not to be limited as changes and modifications may be made which are within the full intended scope as defined by the appended claims.

I claim as my invention:

1. An automatic sound muting circuit for disconnecting sound to a speaker for a predetermined time comprising;
- a bi-stable trigger circuit having an input terminal, a reset terminal and an output terminal,
- a sound circuit connected to said output terminal, and
- said speaker connected to said sound circuit when said trigger circuit is in a first state and said speaker disconnected to said sound circuit when said trigger circuit is in a second state,
- a first pulse circuit connected to the input terminal of said trigger circuit,

- a timing circuit connected to the output terminal of said trigger circuit, and
- a second pulse circuit connected to said timing circuit and having an output terminal connected to the reset terminal of said trigger circuit.

2. An automatic sound muting circuit according to claim 1, wherein a remote switch is connected to said first pulse circuit to energize it.

3. An automatic muting circuit according to claim 2, wherein said timing circuit comprises a capacitor and a resistor connected together.

4. An automatic muting circuit according to claim 3, comprising a first transistor connected between the output terminal of said trigger circuit and said sound circuit.

5. An automatic sound muting circuit according to claim 4, comprising a second transistor forming part of said second pulse circuit and with its base connected to said timing circuit and its output connected to said reset terminal of said trigger circuit.

6. An automatic sound muting circuit according to claim 5, including a unilateral current device connected between the output terminal of said bistable trigger circuit and said capacitor of said timing circuit.

7. An automatic sound muting case according to claim 6, wherein resistor of said timing circuit is variable.

8. An automatic sound muting circuit according to claim 6, wherein the emitter of said second transistor is connected to the output terminal of said bistable trigger circuit.

9. An automatic sound muting circuit according to claim 8, including a NAND gate between the collector of said second transistor and said reset terminal.

10. An automatic sound muting circuit according to claim 9, including an inverter between the emitter of said second transistor and a second input of said NAND gate.

* * * * *